(No Model.) 5 Sheets—Sheet 1.

J. W. COULTAS.
CIRCULAR PRESSURE MACHINE.

No. 453,740. Patented June 9, 1891.

Witnesses:
Inventor (No Model.) 5 Sheets—Sheet 2.

J. W. COULTAS.
CIRCULAR PRESSURE MACHINE.

No. 453,740. Patented June 9, 1891.

Witnesses:
Inventor (No Model.) 5 Sheets—Sheet 3.
J. W. COULTAS.
CIRCULAR PRESSURE MACHINE.
No. 453,740. Patented June 9, 1891.
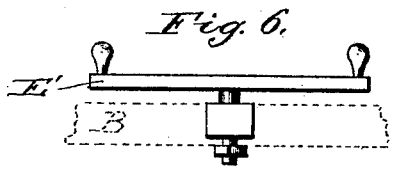
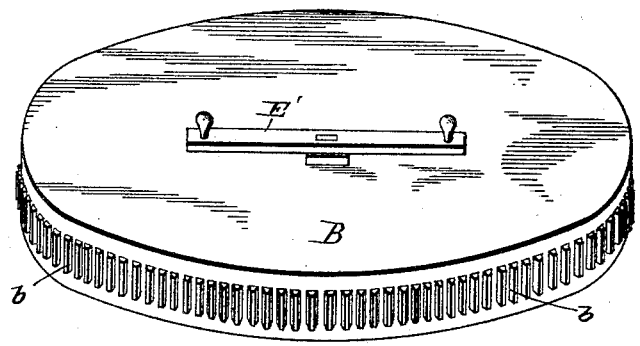
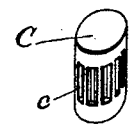
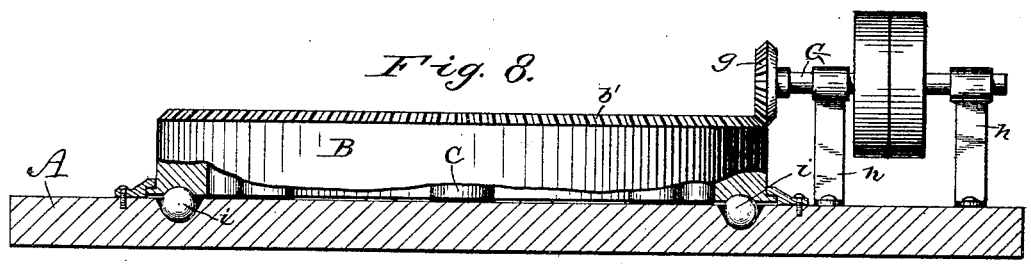
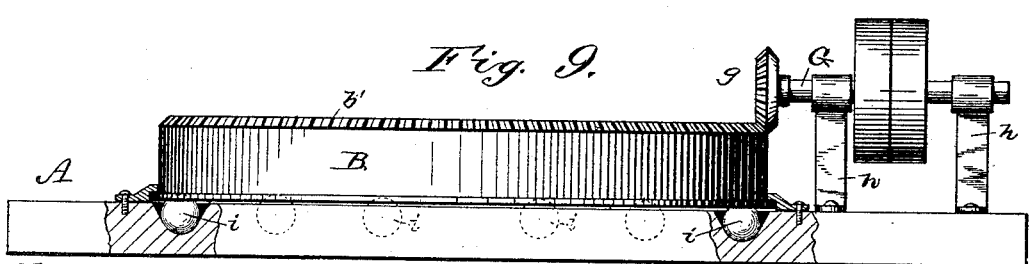
Witnesses:
Inventor: James W. Coultas (No Model.)  5 Sheets—Sheet 4.
J. W. COULTAS.
CIRCULAR PRESSURE MACHINE.

No. 453,740. Patented June 9, 1891.

Witnesses:

Inventor (No Model.) 5 Sheets—Sheet 5.
J. W. COULTAS.
CIRCULAR PRESSURE MACHINE.

No. 453,740. Patented June 9, 1891.

Witnesses:
Inventor:

UNITED STATES PATENT OFFICE.

JAMES W. COULTAS, OF HAVANA, ILLINOIS.

CIRCULAR-PRESSURE MACHINE.

SPECIFICATION forming part of Letters Patent No. 453,740, dated June 9, 1891.

Application filed November 3, 1890. Serial No. 370,247. (No model.)

*To all whom it may concern:*

Be it known that I, JAMES W. COULTAS, a citizen of the United States, residing at Havana, in the county of Mason and State of Illinois, have invented a new and useful Circular-Pressure Machine, of which the following is a specification.

The purpose of my invention is to produce an even pressure upon a circular surface with the least possible friction, either expanding or contracting the same. It may be used to slightly expand or contract wheel-tires or to expand or contract metallic bands or rings of any kind. It may be reduced in size and used as a tool to produce the even circular pressure needed in making smoke-stacks or wherever an even pressure upon a circular surface is desired. Its essential features are the gain in mechanical power and the avoidance of friction by the use of lateral, elliptical, or oblong wheels or bars.

I will now proceed to describe its particular construction, reference being had to the accompanying drawings.

Figure 1:
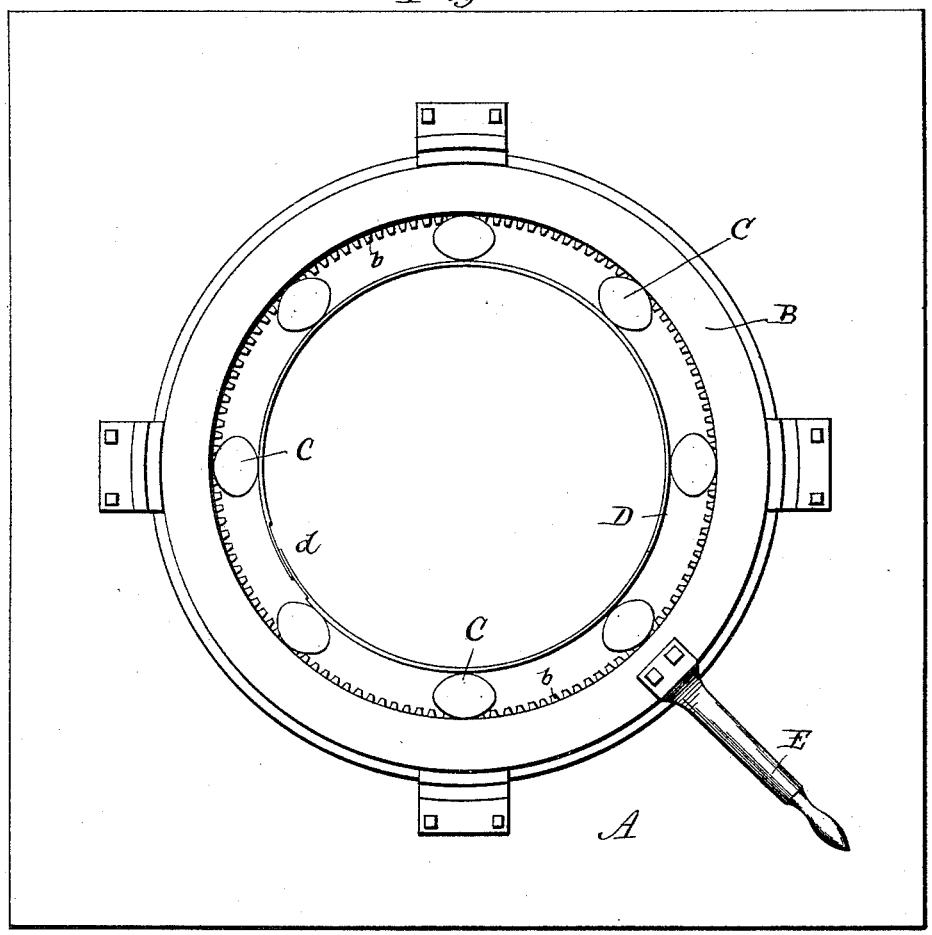
Figure 2:
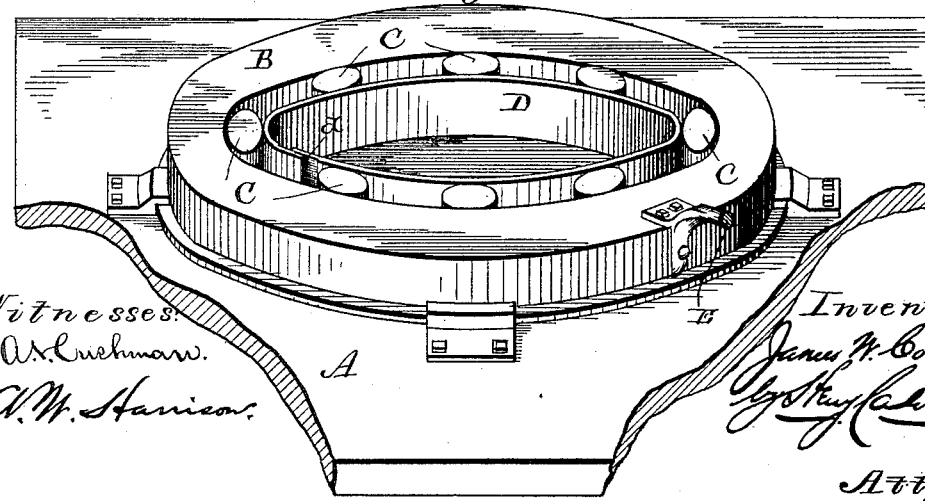
Figure 3:
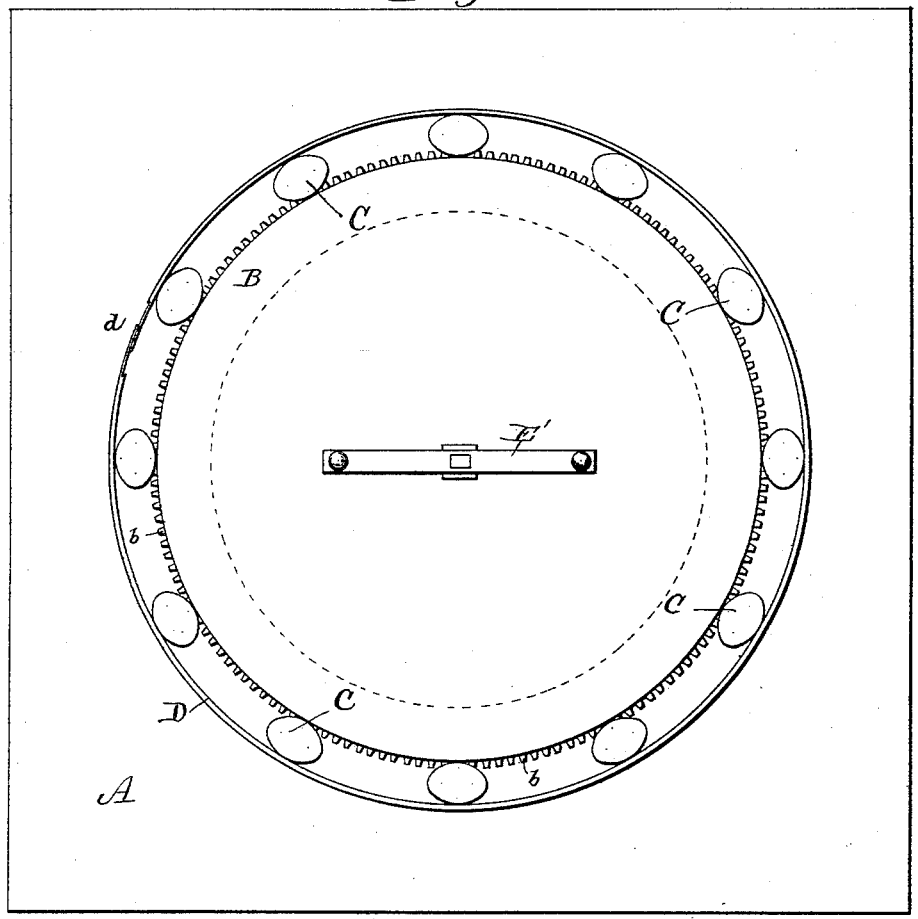
Figure 4:
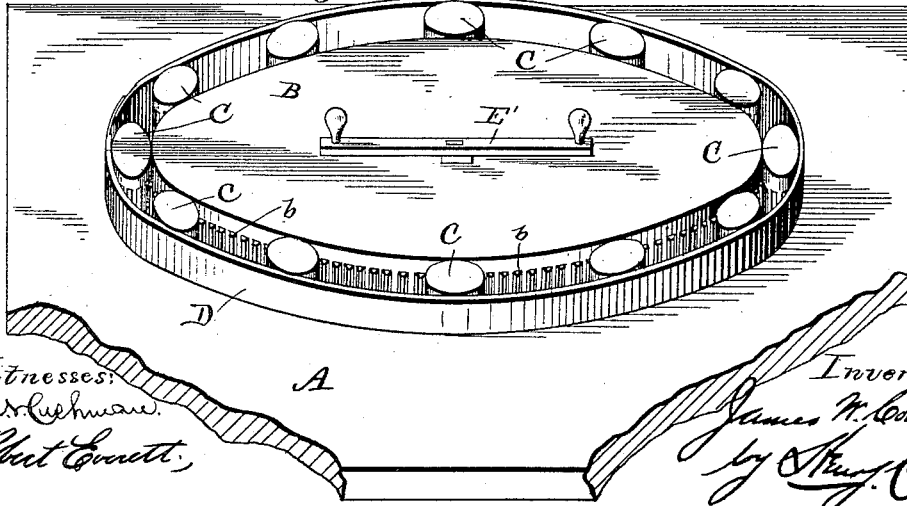
Figure 10:
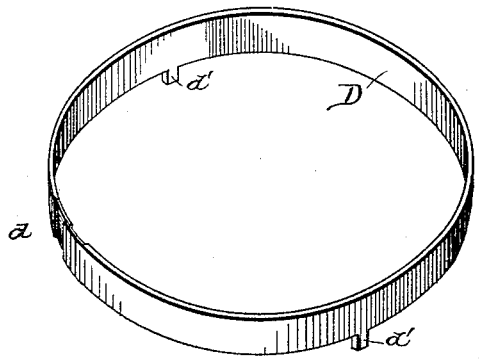
Figure 11:
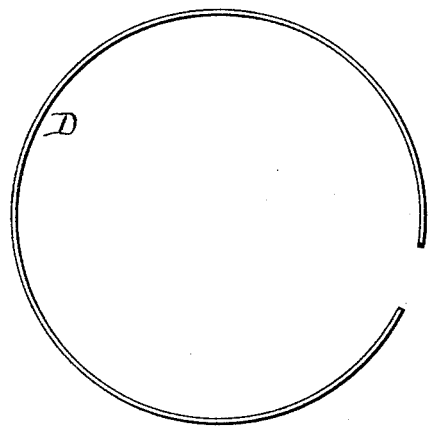
Figure 12:
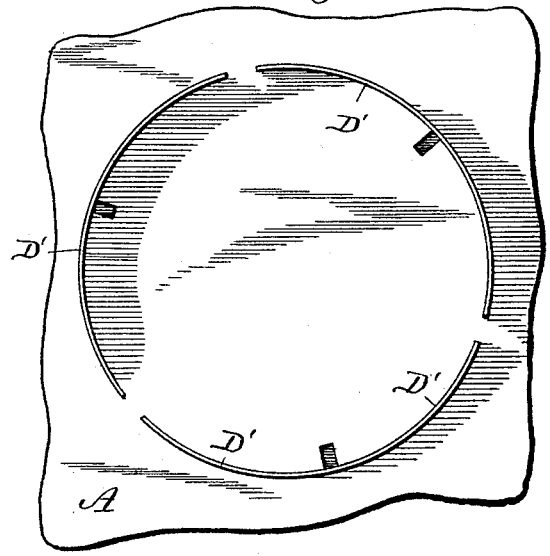
Figure 13:
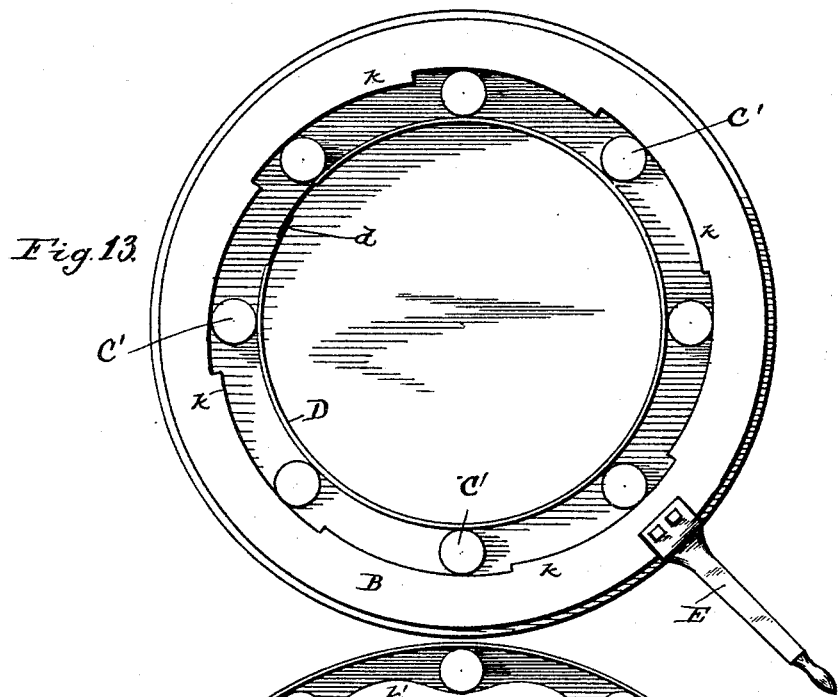
Figure 14:
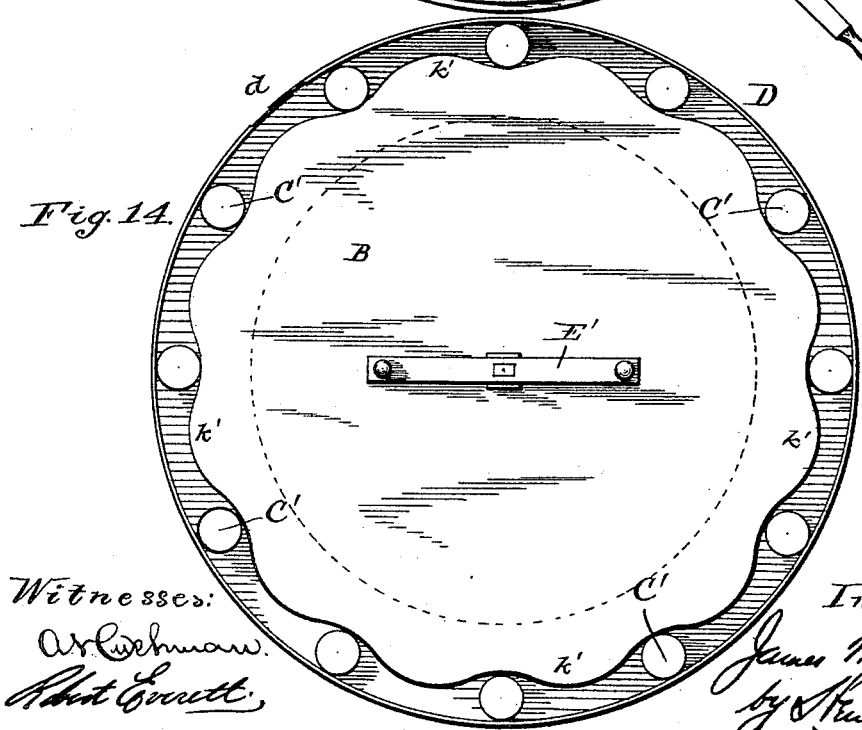

Figure 1 is a plan view of a simple apparatus embodying my invention. Fig. 2 is a perspective view thereof. Figs. 3 and 4 are plan and perspective views, respectively, of another form of apparatus embodying my invention. Fig. 5 is a detail view in perspective of the operating-wheel. Fig. 6 is a detail view of the handle therefor. Fig. 7 is a detail perspective view of one of the notched elliptical cylinders. Figs. 8 and 9 illustrate a form of my apparatus to be operated by power. Figs. 10, 11, and 12 are detail views of the pressure-ring. Figs. 13 and 14 illustrate still other forms of my invention.

A denotes a suitable base, on which is placed a strong operating-wheel B, having gear-teeth $b$, and contiguous to said wheel is placed in a circle a series of bars or cylinders C, which may be provided with notches $c$ (see Fig. 7) to be engaged by the teeth $b$ of the wheel or disk B. These bars or cylinders C are preferably of elliptical form in cross-section, and if it be desired to produce great pressure they are only slightly elliptical, and if less power and more movement be desired they may be made more elliptical. There should be as many of these elliptical bars or cylinders as the circle will admit of and allow room for their free revolution. The bars or cylinders C are arranged or placed so as to be parallel with each other, and are thus adapted to operate evenly on cylindrical or straight-sided articles.

D denotes an elastic pressure-ring, which is preferably split and of a proper length to have overlapping portions at $d$, and said ring is to be interposed between the bars or cylinders C and the article to be contracted or expanded. It is, however, not necessary that the ring should have the overlapping portions $d$, as it may be simply divided, as shown in Fig. 11, or formed in segments D', as shown in Fig. 12.

In Figs. 1, 2, and 13 the split or divided ring D is shown as being inside the bars or cylinders C, being thus adapted for contracting articles; but in Figs. 3, 4, and 14, where said ring D is shown as being outside of the bars or cylinders C, the apparatus is adapted for expanding articles. The divided ring D may rest at its lower end in a suitable wide groove in the base or bed A.

With the parts constructed as above described and with the bars or cylinders C interposed between the wheel B and ring D an article of iron, steel, or other metal to be contracted or expanded will be placed inside or outside, as the case may be, of the divided ring D, and the wheel B will then be partially rotated, causing rotation of the elliptical bars C and contraction or expansion of the divided ring D and consequent compression or expansion of the article or articles inside or outside thereof. The wheel B is to be provided with means by which it may be rotated, such means being shown in Figs. 1, 2, and 13 as the handle E, and in Figs. 3, 4, 5, 6, and 14 as the bar E', and a bar or lever may, if desired, be applied to the latter for greater power.

In Figs. 8 and 9 the wheel B is shown as being provided at its top with gear-teeth $b'$, meshing with a bevel gear-wheel $g$ on a power-driven shaft G, journaled in suitable standards $h$.

To enable the heavy wheels B to be rotated easily, they are preferably mounted on ball or roller bearings $i$, arranged in a suitable groove in the base A, and to prevent the rotation of the ring D with the bars or cylinders C and wheel B said ring D may be provided at its bottom with one or more studs or projections $d'$, Fig. 10, to enter apertures in the base A.

Instead of bars or cylinders of elliptical form, round bars or cylinders C' may be employed in connection with a series of inclines made on the operating-wheels B, up which the said bars will ride to contract or expand the ring D or the article to be contracted or expanded. This form of my invention is shown in Figs. 13 and 14. In Fig. 13 the inclines $k$ are shown as being formed on the inner face of the annular operating-wheel B, while in Figs. 14 these inclines are shown in the form of swells $k'$ on the outer face of the operating-wheel B. With the round bars or cylinders C' no teeth on the operating-wheels will be required to cause them to turn or roll, as the friction on them will be sufficient for this purpose. In fact, with the elliptical bars or cylinders the teeth on the operating-wheels and the notches in the bars or cylinders are not positively necessary, but are preferred for certainty of operation and to make the action more positive.

While I prefer to employ the divided pressure-ring in connection with the operating-wheel and the expanding or contracting bars or cylinders, I do not wish to be understood as limiting my invention to the use of such ring, which serves only to hold the bars or cylinders in place and to transmit their power, as the article or articles to be contracted or expanded may be placed directly in contact with the power-applying contracting or expanding bars or cylinders.

It will be understood that my apparatus may be of any desired size, according to the class of work to be done, and may be made small for use as a hand-tool for some kinds of work.

The operating or use of my improved apparatus is as follows: A wheel-tire or other article which it is desired to contract or expand is to be placed within or without the circle of bars or cylinders C, either in direct contact therewith or in contact with the pressure-ring D, if the latter be employed. A partial rotation is then given to the operating-wheel B, causing the bars or cylinders to change from their shortest diameters to their longest diameters radially of the operating-wheel, when said bars or cylinders are of elliptical form in cross-section, or causing them to ride up the inclines of the operating-wheel when they are of circular form in cross-section, thereby contracting or expanding by a powerful pressure the article or articles being operated on.

Having thus described my invention, I claim and desire to secure by Letters Patent—

1. An apparatus for contracting or expanding metallic or other articles, and consisting of the combination, with an operating-wheel, of a series of bars or cylinders placed in a circle contiguous to said wheel, so as to be rotated thereby, said bars or cylinders being arranged parallel with each other, to operate substantially as set forth.

2. An apparatus for expanding or contracting metals or other articles, consisting of the combination, with an operating-wheel B, of a divided pressure-ring and a series of bars or cylinders interposed between said operating-wheel and pressure-ring and adapted to be rotated by the said wheel.

3. An apparatus for expanding or contracting metals or other articles, consisting of the combination, with an operating-wheel B, of a divided pressure-ring and a series of elliptical bars or cylinders interposed between said operating-wheel and pressure-ring and adapted to be rotated by the said wheel.

4. The combination, with an operating-wheel B, having means for turning the same and provided with gear-teeth $b$, of a divided pressure-ring and a series of elliptical bars or cylinders interposed between said operating-wheel and pressure-ring and adapted to be engaged by said gear-teeth to be rotated.

5. The combination, with a bed or base A, of an operating-wheel B, anti-friction bearings interposed between said bed or base and the bottom of said wheel, a divided pressure-ring, and a series of bars or cylinders interposed between said operating-wheel and pressure-ring and adapted to be rotated to expand or contract the article or articles to be operated on.

6. The combination, with a bed or base A, of an operating-wheel B, anti-friction bearings interposed between said bed or base and the bottom of said wheel, and a series of bars or cylinders adapted to be rotated to expand or contract the article or articles to be operated on.

JAMES W. COULTAS.

Witnesses:
WILLIAM L. HEBERLING,
CARL J. PFETZING.